United States Patent
Bunn et al.

[11] Patent Number: 5,912,662
[45] Date of Patent: *Jun. 15, 1999

[54] WRITING INSTRUMENT

[75] Inventors: Eric A. Bunn, San Jose; Ronald L. Hensley, Cupertino, both of Calif.

[73] Assignee: PenWare Systems, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/722,348

[22] Filed: Sep. 27, 1996

[51] Int. Cl.$^6$ .................................................. G09G 5/00
[52] U.S. Cl. ................................ 345/179; 345/173
[58] Field of Search ................................ 345/179, 173, 345/174, 180, 181, 182; 178/18, 19

[56] References Cited

U.S. PATENT DOCUMENTS

| | | | |
|---|---|---|---|
| 4,493,104 | 1/1985 | Lukis et al. | 382/13 |
| 4,638,582 | 1/1987 | Farrar | 42/71.01 |
| 4,679,241 | 7/1987 | Lukis | 382/13 |
| 5,010,213 | 4/1991 | Moriwaki et al. | 178/18 |
| 5,019,677 | 5/1991 | Menen | 345/179 |
| 5,061,828 | 10/1991 | Purcell | 178/19 |
| 5,132,671 | 7/1992 | Louis et al. | 345/179 |
| 5,159,321 | 10/1992 | Masaki et al. | 178/19 |
| 5,305,017 | 4/1994 | Gerpheide | 345/174 |
| 5,339,213 | 8/1994 | O'Callaghan | 361/163 |
| 5,488,204 | 1/1996 | Mead et al. | 345/179 |
| 5,646,650 | 7/1997 | Miller et al. | 345/179 |

OTHER PUBLICATIONS

Cirque Glidepoint Products, User Manual, PC–Compatible Version, Cirque GlidePoint® DeskTop, Cirque GlidePoint® Keyboard, Cirque GlidePoint® Wave Keyboard, 1995, pp. ii–iv, 1–19.

*Primary Examiner*—Matthew Luu
*Attorney, Agent, or Firm*—Michael A. Kaufman; Flehr Hohbach Test Albritton & Herbert LLP

[57] ABSTRACT

A writing instrument for use with trackpad type of navigational devices for computers is described. The writing instrument includes a standard grip as typically found in a pen so that a human can move the instrument about the surface as desired. The instrument also includes a contact end simulating a fingertip, and the grip is electrically coupled to the contact end.

20 Claims, 3 Drawing Sheets

5,912,662

WRITING INSTRUMENT

BACKGROUND OF THE INVENTION

The present invention relates to the input of information into a computer and, more particularly, to an instrument for interacting with a trackpad type navigational device for inputting information.

Trackpad type navigational devices for controlling movement of a pointer on a display screen are now relatively common. These navigational devices typically have a surface which is to be contacted by a human finger. Movement of the finger on the surface controls movement of the pointer. Many portable computers incorporate a trackpad navigational device as an integral part thereof.

Different trackpad navigational devices of the trackpad type operate on different electrical principles to sense movement of a human finger. For example, some rely on capacitance, others rely on the disturbance or distortion of an electric field, and others on the finger causing conductors to contact, etc. All of such devices, though, rely on the electrical properties provided by the human as manifested in the human finger and on contact over an extended surface area as is provided by a fingertip. Trackpad navigational devices generally sense the full fingertip but then calculate the centroid of the finger for their operation. In other words, the fingertip is translated into a single point of contact.

Although many say theoretically they are not limited to the pointer being a human finger, as a practical matter only those which are not activated by a simple touching of the pad surface by any conductor are widely used. There simply are too many instances in which a conductor accidentally may be brought into contact with the pad surface to make those responsive to any conductive touching practical.

Most computers which rely on the trackpad navigational devices to control movement of a pointer on a display screen typically include a program for "accelerating" the motion. As a finger moves faster on the pad surface, for example, this movement is interpreted as directing the pointer to move further on the screen than is indicated by the distance through which the finger moves. In other words, the relationship between finger movement on a pad surface and the resulting movement of a pointer on a screen is nonlinear.

SUMMARY OF THE INVENTION

The present invention relates to an instrument which is usable to input information into a computer via a trackpad navigational device. In this connection, it takes the place of a human finger. However, it simulates the aspects of the finger needed to activate the navigational device. In this connection, it includes a contact end which simulates a fingertip. As one major feature, it has a size to contact enough of the pad surface to appear to be similar to a fingertip. It also includes a grip for moving the contact end on the trackpad surface which is electrically coupled to the contact end. In those instances in which the instrument is to be used as a writing instrument to input a signature or the like to the computer via the trackpad navigational device, the computer is provided with a program code which assures there is a constant relationship between movement sensed by the pad surface and the reaction of the computer to the movement. This may mean in many situations simply providing the code necessary to allow the "mouse acceleration" software to be deactivated.

Other features and advantages of the invention either will become apparent or will be described in connection with the following, more detailed description of a preferred embodiment of the invention and variations.

BRIEF DESCRIPTION OF THE DRAWING

With reference to the accompanying drawing.

DETAILED DESCRIPTION OF THE PREFERRED EMBODIMENT(S)

The following relatively detailed description is provided to satisfy the patent statutes. It will be appreciated by those skilled in the art, though, that various changes and modifications can be made without departing from the invention.

Figure 1:
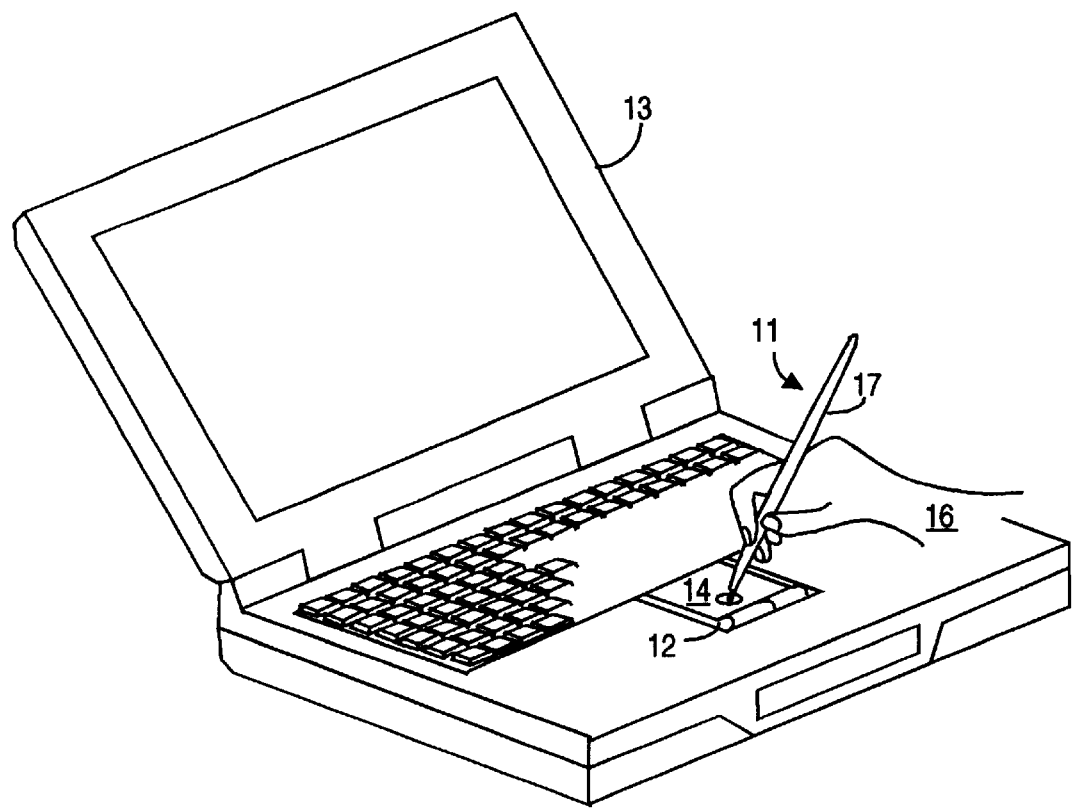
FIG. 1 is an isometric view of a preferred embodiment of the instant invention interacting with a trackpad navigational device incorporated into a portable computer.
Figure 2:
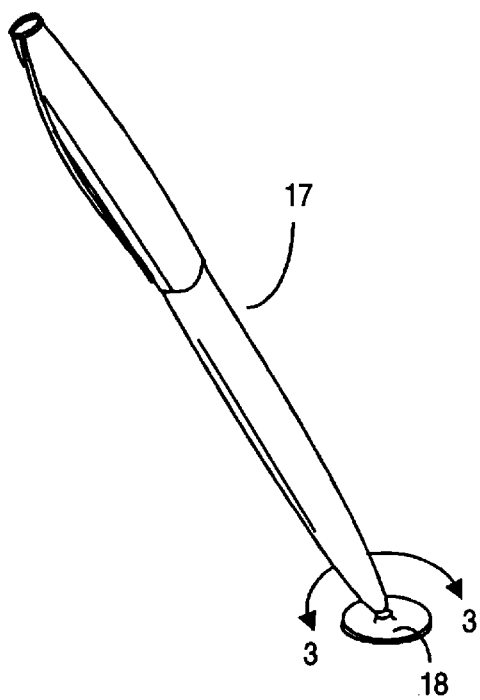
FIG. 2 is a view of a writing instrument incorporating a preferred embodiment of the invention.
Figure 3:
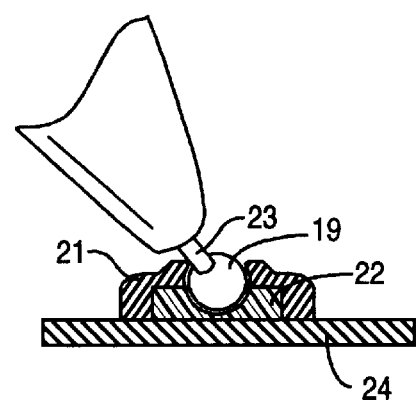
FIG. 3 is an enlarged partial view of that portion of the preferred embodiment shown in FIG. 2 encircled by the lines 3—3.

A preferred embodiment of an instrument of the invention is generally referred to in FIG. 1 by the reference numeral 11. Such preferred embodiment is illustrated interacting with a trackpad type of navigational device 12 incorporated into a portable computer 13. That is, it is in contact with the pad surface 14 of the navigational device. As illustrated, it is held in electrically conducting relationship by a human represented by hand 16.

In the disclosed embodiment, instrument 11 is a writing instrument to input a signature or other writing into the computer. The navigational software which is provided for use with this type of a navigational device typically has an acceleration mode built into the same. In this embodiment in which the instrument is a writing instrument, program coding is included which will provide a linear relationship between movement sensed by the pad and the reaction of the computer to such movement—it will disable the typical acceleration code. This program and its code is not shown in any detail since it is well within the skill of the art to provide the same once its need is disclosed. Thus, the navigational device is transformed to be used for computer input separate and apart from the movement of a pointer on a screen, just as the signature pads provided by PenWare Systems, Inc. of Sunnyvale, Calif.

Writing instrument 11 includes both a grip 17 to enable manipulation by a user and a contact end 18. (In this preferred embodiment, grip 17 is essentially a simple tube which simulates that portion of other types of writing instruments held by a human user.) It is the contact end 18 which simulates a fingertip and interacts with the pad surface 14. Thus, there is a ball and socket connection which both electrically and physically secures the contact end with the tubular grip 17. Such contact is made up in this embodiment by a metal sphere 19 which is captured by being sandwiched between a socket flange 21 and a circular plate 22. Such circular plate is press fit within the member 21 to cooperate with the same for capturing the sphere.

The contact end is in good electrical contact with the grip. To this end, a rod 23 is press fit into the sphere 19 and extends into a bore within the end of grip 17. Although for simplicity and best results the grip and the pieces of the contact end are of metal which contact one another physically to provide good electrical conduction, other electrical coupling, e.g., an inductance or capacitance coupling, is also within the contemplation of the invention from the broad standpoint.

As mentioned previously, the contact end simulates those aspects of a fingertip needed to be sensed by the pad surface. In this particular embodiment the end is configured to electrically contact at least about 0.2 inches of the pad surface. Although from the broad standpoint this contact could be linear, along a single axis line in the plane of the pad, as a practical matter it is preferable that it be disk shaped to sweep out an area having a dimension or diameter of at least 0.2 inches in all directions. While it has been found that a dimension of less than 0.2 inches will work, the reliability decreases as the dimension is lowered. It is believed as a practical matter that the dimension has to be at least 0.175 inches to provide a realistic reliability. It is to be noted that the contact surface 24 provided by the contact end has a shape which is complementary to that portion of the pad surface 14 with which it is expected to be used. In this connection, most pad surfaces of trackpad navigational devices are planar and the shape of contact surface 24 is flat.

Operation of the preferred embodiment discussed to this point should be quite apparent. The writing instrument is manipulated on the pad surface 14 as necessary to input the writing that is desired. When the instrument is a writing instrument, it can be used to input a signature just as can be a signature pad of the type sold by PenWare Systems, Inc. The use of the embodiment of the instant invention, therefore, eliminates the need for a separate signature pad in those computers having a trackpad navigational device already incorporated into the same. It also obviates the need of a separate signature pad for signature input when stand-alone trackpad navigational devices are used.

Figure 4:
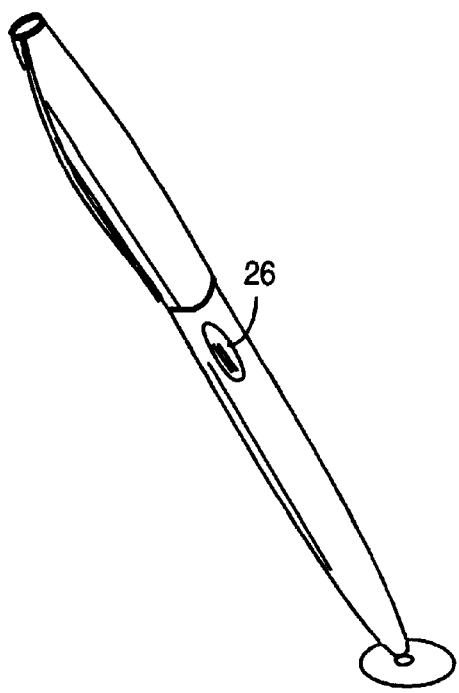
FIG. 4 illustrates a modification to the preferred embodiment of FIGS. 2 and 3.

Most trackpad navigational devices now available are designed to sense not only finger movement, but also interruptions in contact. This manifests itself in the ability of many trackpad navigational devices being able to respond to taps by performing some function, i.e., selecting or opening a file. FIG. 4 illustrates a modification to the preferred embodiment of the invention which takes advantage of this capability without the necessity of requiring the writing instrument to be removed from the pad surface. That is, it includes a switch 26 which can be activated to break the electrical connection between the grip 17 and the contact end 18. (The actual mechanism for breaking the electrical connection is not shown since it is well within the skill in the art to provide the same.) It is to be noted that one might well arrange it that a single movement of the switch will result in a predetermined series of break sequences, i.e., an opening and closing of the conduction path for predefined periods of time. For example, actuation of the switch can result in a series of break sequences of short and long periods of time for various purposes, such as for encryption or a password, i.e., a computer will only open a file if instructed via a pen to do so if it recognizes the particular pen. There also may be several different sequences obtainable by different positions of the switch.

Figure 5A:
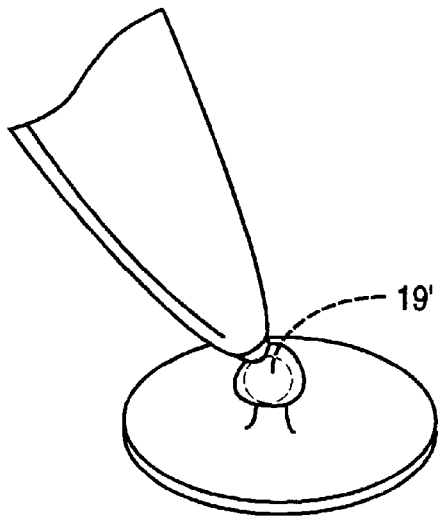
FIGS. 5A–5H illustrate alternative constructions for contact end of an instrument of the invention.

FIGS. 5A–5H show various alternative contact ends. (Parts previously identified are referred to by the same reference numeral, and like parts are referred to by primed versions of the reference numerals.) FIG. 5A simply shows a reverse of the preferred embodiment discussed previously. That is, while it is a ball and socket connection, the socket is on the pen whereas the ball 19' is on the instrument contact end.

Figure 5B:
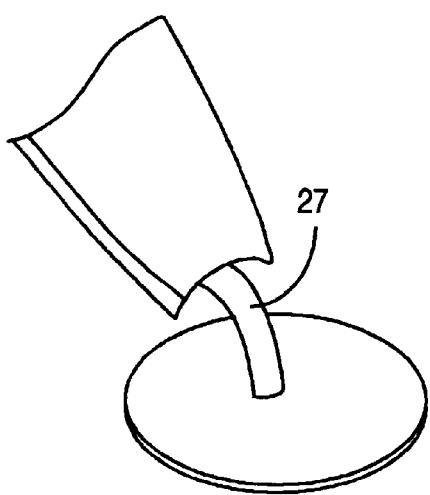

FIG. 5B shows the use of an articulated neck portion 27 in the connection between the grip and contact end, providing the capability of different angular orientations. Articulated neck portion 27 will provide flexibility. While the full neck could be articulated, it is contemplated that only a section is provided having the articulation necessary to provide flexibility. Such flexibility also can be provided by a neck-down portion, for example, of a relatively rigid plastic connection. If the connection is quite flexible, it may be desirable in certain instances to provide a relatively rigid shroud surrounding the flexible neck to act as a stop and prevent flexing beyond that believed to be necessary for writing.

Figure 5C:
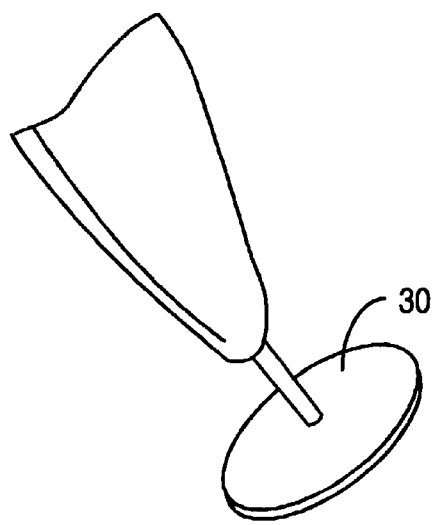
Figure 5D:
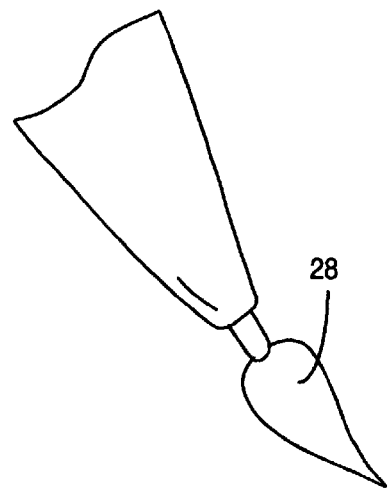
Figure 5E:
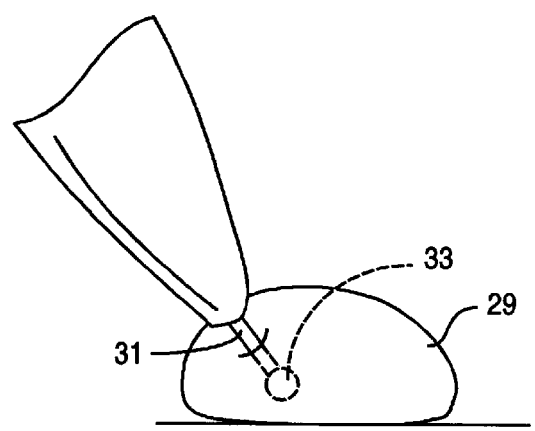

FIG. 5C shows the contact surface being provided by a flexible disk 30. That is, it is within the contemplation of the invention to make the disk flexible rather than, or in addition to, the connection between the disk and the remainder of the writing instrument being flexible. The contact end can also be provided by a conductive foam plastic, such as that sold with the trademark STAT KON. FIG. 5D shows such an arrangement in which the foam portion 28 is configured like a "paintbrush", i.e., is flexible to conform to the pad surface of the trackpad navigational device. FIG. 5E shows an arrangement in which the foam portion 29 is generally spherical shaped and is compressible. Such figure shows it being compressed against the pad surface. As illustrated, a rigid support 31 provided by a rod 32 having a spherical end 33 also can be provided to assure that the compressible foam portion 29 is not compressed beyond a predetermined position. That is, the support 31 acts as a stop when it engages (through a portion of the compressed foam) the pad surface.

Figure 5F:
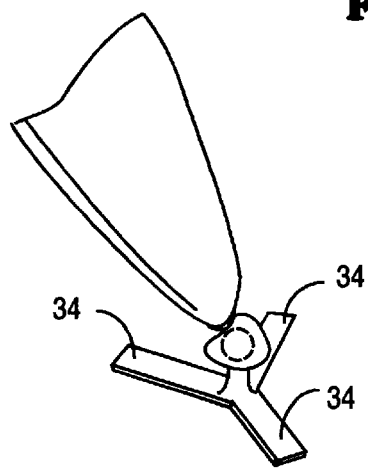

As mentioned previously, it is not necessary that the contact be for a full area. In some instances it is only necessary that the contact be in particular directions on the pad surface. FIG. 5F shows a contact end arrangement in which the contact is provided by elongated strips 34 rather than a disk. This contact also could be provided by separate concentric rings which either each are fully conductive or are each separated into conductive portions to provide contact in the directions shown by the strips 34.

Figure 5G:
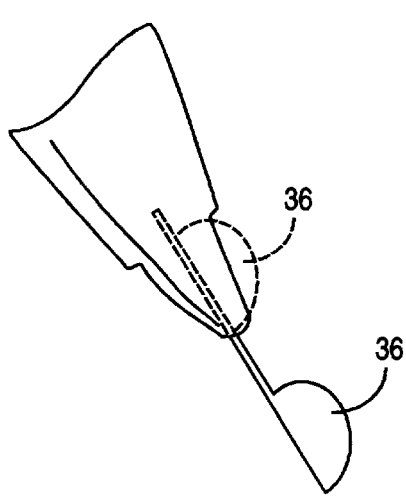
Figure 5H:
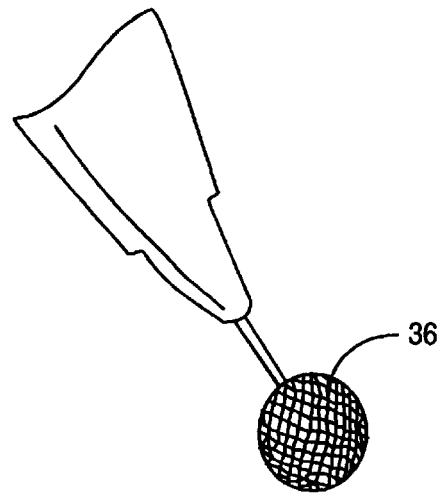

It also is desirable in some situations to provide a contact end which is collapsible for retraction within the barrel of the grip while yet being expandable once it projects from the barrel to provide the contact area needed to interact with the pad surface. To this end, the contact end may be provided as a star accordion folded arrangement of conductive material. It then can be folded as is common for many decorations in a layer arrangement 36 as shown in FIG. 5G which can be unfolded to provide an enlarged contact end 37 as shown in FIG. 5H.

As mentioned at the beginning of the detailed description, applicant is not limited to the specific embodiments and variations described above. For example, although the instrument has been described in some detail with respect to writing, it will be recognized that it can be used to input other information into the computer or, for example, to replace a finger for controlling the movement of a pointer on a display screen. The claims, their equivalents and their equivalent language define the scope of protection.

What is claimed is:

1. A writing instrument for inputting information into a computer via a trackpad navigational device having a pad surface that is contacted to control said computer, comprising:

an electrically conductive grip retainable in a user's hand to move said writing instrument; and a contact end, mechanically and electrically coupled to a distal end of said grip;

wherein retention of said grip in said hand causes said contact end to electrically simulate a fingertip such that said trackpad navigational device senses electrical contact between said contact end and said pad surface.

2. The writing instrument of claim 1, wherein said contact end has an effective surface area of at least about 0.024 square inches.

3. The writing instrument of claim 1, wherein said contact end is articulatably coupled to said distal end of said grip.

4. The writing instrument of claim 1, wherein said contact end has a contact surface shape complementary to a portion of said pad surface with which it is to be used.

5. The writing instrument of claim 1, wherein said pad surface is generally planar, and said contact end has a generally flat pad-facing surface.

6. The writing instrument of claim 1, wherein said writing instrument inputs user-created writing via said trackpad into said computer;

wherein said computer includes program code means for providing a linear relationship between movement of said writing instrument sensed by said pad surface and response of said computer to said movement.

7. The writing instrument of claim 1, wherein said contact end comprises a disk; and said disk is mechanically and electrically coupled to said distal end of said grip using a mechanism selected from a group consisting of (i) a ball and socket connection, and (ii) an articulated neck.

8. The writing instrument of claim 1, wherein said grip and sand contact end are fabricated from a material including metal.

9. The writing instrument of claim 1, wherein said contact end includes a disk sufficiently flexible to enable a pad-facing surface of said disk to conform to said pad surface.

10. The writing instrument of claim 1, wherein said contact end includes an electrically conductive foam configured and positioned to contact said pad surface when said writing instrument is used.

11. The writing instrument of claim 10, wherein said foam is sufficiently flexible to conform to said pad surface.

12. The writing instrument of claim 10, wherein said foam is sufficiently compressible to be compressed against said pad surface.

13. The writing instrument of claim 12, further including a support member positioned so as to prevent compression of said foam beyond a predetermined position.

14. The writing instrument of claim 1, further including means for selectively interrupting electrical coupling between said grip and said contact end;

said means for selectively interrupting including a switch disposed on said grip for actuation by said user to control said means for selectively interrupting.

15. A writing instrument for inputting information into a computer via a trackpad navigational device having a pad surface that is contacted to control operation of said computer, comprising:

an electrically conductive grip retainable in a user's hand to move said writing instrument; and a contact end mechanically coupled and electrically coupleable to a distal end of said grip;

a switch electrically coupled in series between said grip and said contact end such in a first switch position said grip is electrically coupled to said contact end, and in a second switch position said grip is electrically de-coupled from said contact end;

wherein when said switch is in said first switch position and said grip is retained in said hand, said contact and electrically simulates a fingertip such that said trackpad navigational devices senses contact between said contact end and said pad surface.

16. The writing instrument of claim 15, wherein said contact end has an effective surface area of at least about 0.024 square inches.

17. The writing instrument of claim 15, wherein said contact end is articulatably coupled to said distal end of said grip.

18. The writing instrument of claim 15, wherein said contact end has a contact surface shape complementary to a portion of said pad surface.

19. A method of inputting information into a computer, with a writing instrument, via a trackpad navigational device having a pad surface that is contacted to control operation of said computer, the method comprising the following steps:

(a) providing a writing instrument having an electrically conductive grip retainable in a user's hand to move said writing instrument and further including a contact end mechanically coupled and electrically coupleable to a distal end of said grip; and (b) contacting a portion of said pad surface with at least a portion of said contact end such that said trackpad navigational device senses electrical contact between said contact end and said pad surface;

wherein said computer may be controlled.

20. The method of claim 19, wherein step (a) includes providing said contact end with an effective surface area of at least about 0.024 square inches.

* * * * *